United States Patent [19]

Slusar

[11] 4,402,100
[45] Sep. 6, 1983

[54] LIP COUNTERBALANCING MECHANISM FOR A DOCKBOARD

[75] Inventor: Randall J. Slusar, Greenfield, Wis.

[73] Assignee: Kelley Company, Inc., Milwaukee, Wis.

[21] Appl. No.: 300,638

[22] Filed: Sep. 9, 1981

[51] Int. Cl.³ .............................................. E01D 1/00
[52] U.S. Cl. ...................................................... 14/71.3
[58] Field of Search ........................ 14/71.3, 71.7, 71.1

[56] References Cited

U.S. PATENT DOCUMENTS

| | | | |
|---|---|---|---|
| 3,117,332 | 1/1964 | Kelley | 14/71.3 |
| 3,203,002 | 8/1965 | McGuire | 14/71.3 |
| 3,444,574 | 5/1969 | Le Clear | 14/71.3 |
| 3,528,118 | 9/1970 | Smith | 14/71.3 |
| 3,646,627 | 3/1972 | Potter | 14/71.3 |
| 3,662,416 | 5/1972 | Brooks | 14/71.3 |
| 3,967,337 | 7/1976 | Artzberger | 14/71.3 |
| 3,997,932 | 12/1976 | Artzberger | 14/71.3 |
| 4,091,488 | 5/1978 | Artzberger | 14/71.7 |

*Primary Examiner*—Nile C. Byers, Jr.

*Attorney, Agent, or Firm*—Andrus, Sceales, Starke & Sawall

[57] ABSTRACT

An adjustable dockboard having an improved lip counterbalancing mechanism. The dockboard includes a ramp that is pivoted at its rear edge to a loading dock and is adapted to be moved from a generally horizontal cross-traffic position to an upwardly inclined position. A lip is hinged to the front edge of the ramp and can be pivoted from a pendant downwardly hanging position to a partially extended position short of its fully extended position by a lip lifting mechanism which is actuated as a consequence of the ramp moving downwardly from the inclined position to the cross traffic position. To aid in swinging the lip to the extended position, a counterbalancing spring is connected through a linkage to the lip, and the linkage provides a relative small counterbalancing force when the lip is in the pendant position, and a substantially greater counterbalancing force when the lip is in the extended position. The counterbalancing mechanism aids in pivoting the lip to the extended position, and also acts to cushion the fall of the lip to the pendant position.

10 Claims, 5 Drawing Figures

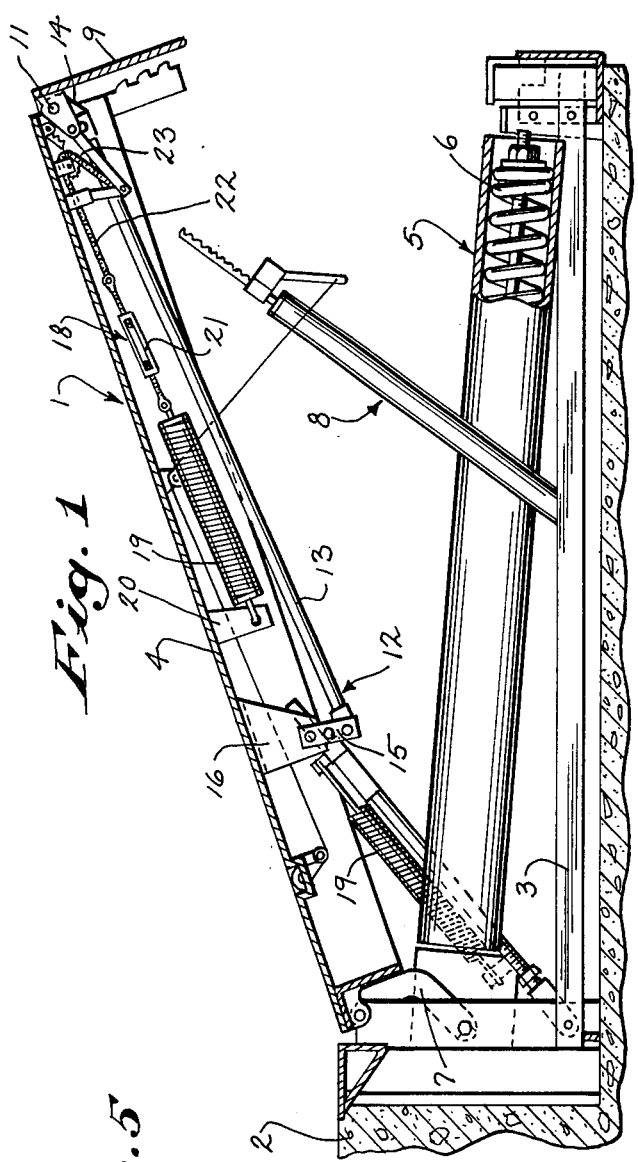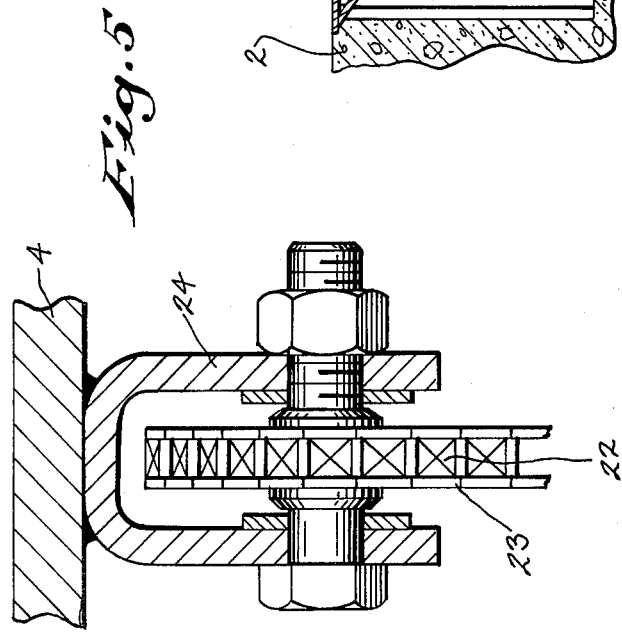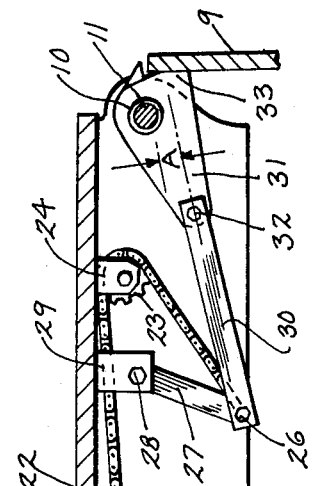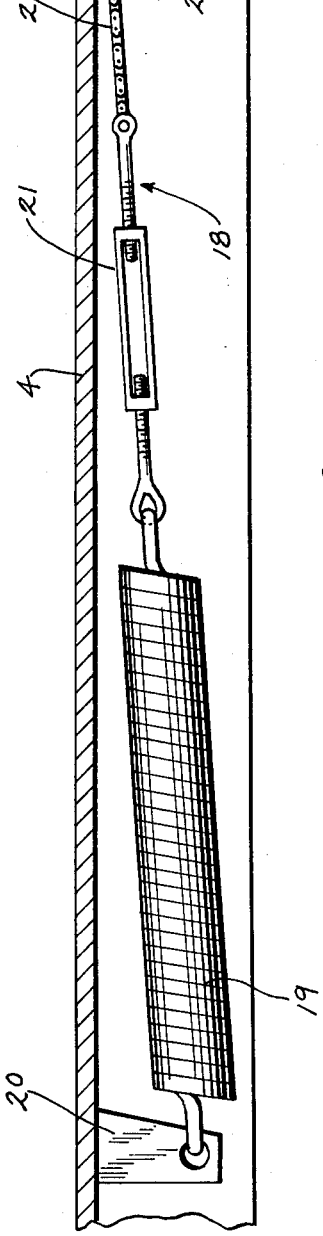

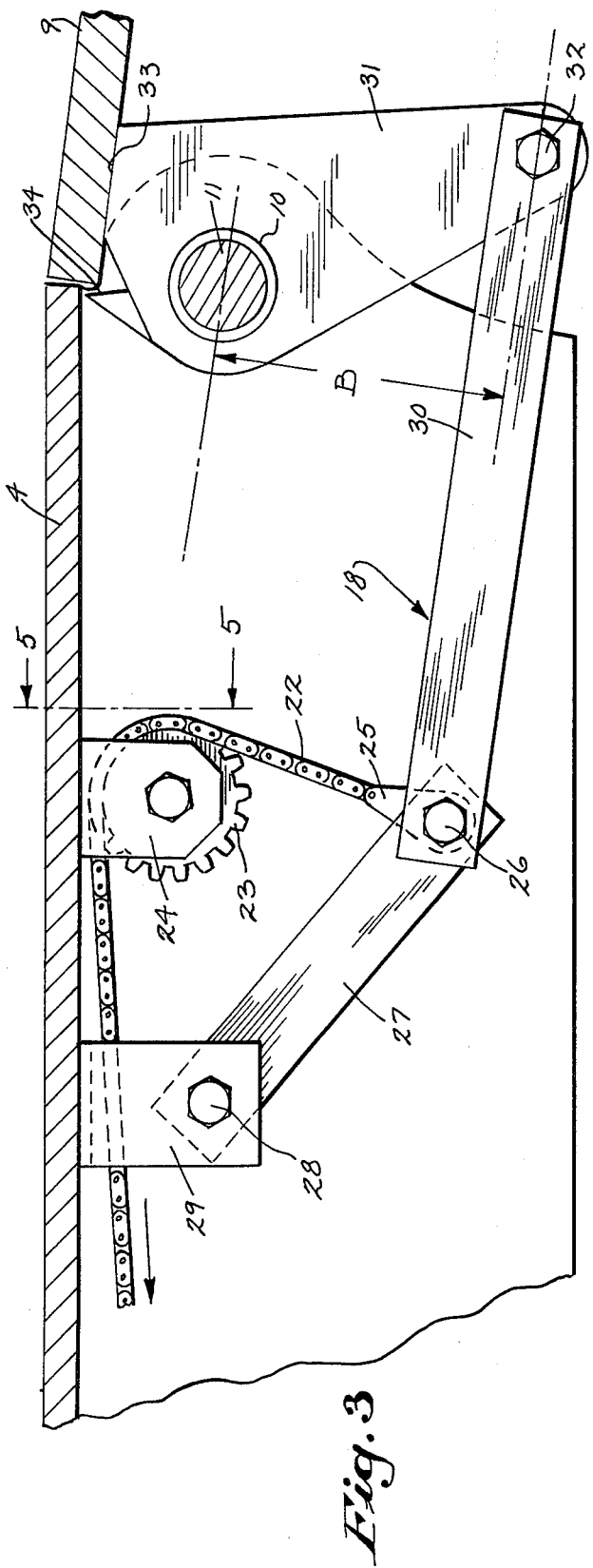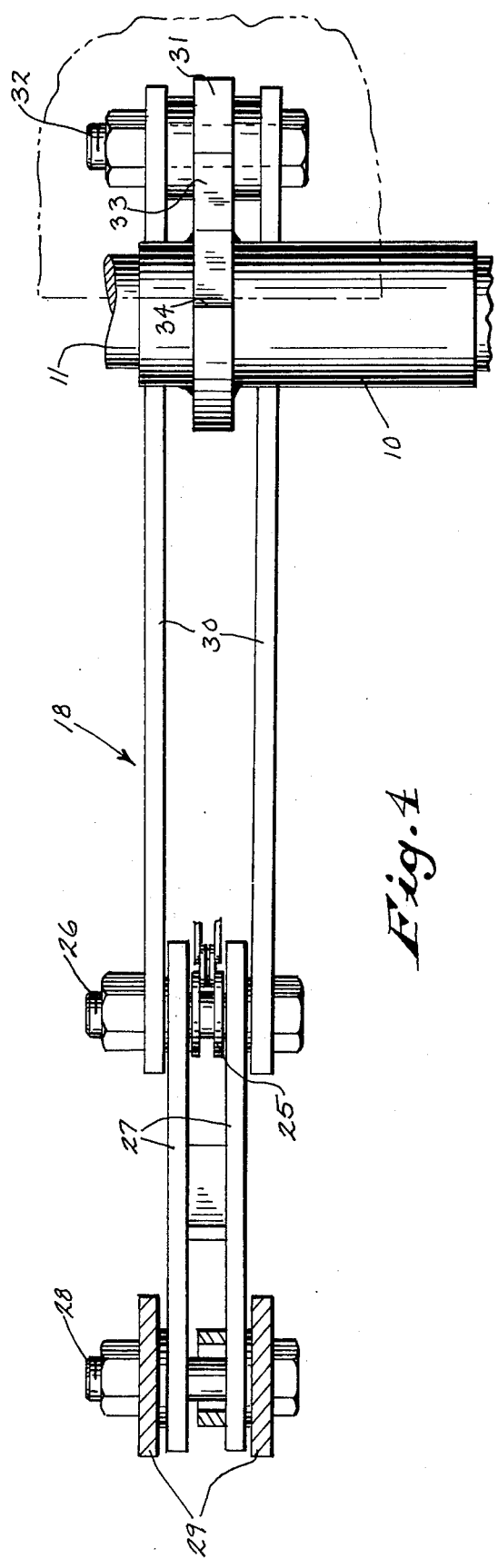

LIP COUNTERBALANCING MECHANISM FOR A DOCKBOARD

BACKGROUND OF THE INVENTION

Dockboards of the type shown in U.S. Pat. No. 3,117,332 include a ramp having its rear end hinged to a loading dock. The ramp is biased upwardly to an inclined position by a spring assembly, and a manually releasable, uni-directional hold-down device holds the ramp against elevation but permits free downward movement of the ramp. Hinged to the front edge of the ramp is an extension lip which is adpated to swing from a downwardly hanging, pendant position, to an elevated position in which the lip forms an extension to the ramp. The lip, when in the extended position, is adapted to engage the bed of a truck or carrier and bridge the gap between the ramp and the truck to enable material handling equipment to move between the dock and the truck bed.

As disclosed in U.S. Pat. No. 3,117,332, the lip is automatically pivoted to its elevated position by a lip lifting and latching mechanism which is actuated by the upward movement of the ramp when the hold-down device is released. With the lip extended and the ramp in the upwardly inclined position, the ramp is then walked down by the operator until the lip engages the bed of the truck. Engagement of the lip with the truck bed releases the weight from the lip latching mechanism, thereby releasing the latching mechanism so that when the truck pulls away from the dock, the lip will automatically return to its pendant position.

U.S. Pat. No. 3,997,932 discloses a dockboard in which the lip is pivoted to its extended position as a consequence of the ramp being walked downwardly from its inclined position toward its cross traffic position. The lip lifting mechanism includes a toggle unit which is an undercenter position when the ramp is in the horizontal cross-traffic position. As the ramp is elevated, a latching bar is operatively connected to the toggle unit and when the ramp is walked down by the operator from the upwardly inclined position, the latching bar moves the toggle unit into an over-center position and pivots the lip to the partially extended position. The latching bar is then disengaged from the toggle unit. The over-center relationship is maintained by the weight of the lip acting rearwardly through the toggle unit.

When the ramp moves downwardly into engagement with the bed of a truck, the lip will move to the fully extended position, thereby releasing the weight of the lip from the toggle unit and enabling the toggle unit to move to its undercenter position by gravity. With the toggle broken, the lip will automatically fall to its pendant position when the truck pulls away from the dock.

As the lip has substantial weight, a lip assist or lip counterbalancing mechanism has been incorporated with dockboards of the type shown in U.S Pat. No. 3,177,332. In U.S. Pat. No. 3,203,002, a lip counterbalancing mechanism includes an extension spring, while in U.S. Pat. No. 4,091,488, a gas spring is employed to aid in counterbalancing the weight of the lip.

With the lip counterbalancing mechanism, the greatest counterbalancing moment is required when the lip is in the extended position. Consequently, the counterbalancing mechanism, as used in the past, had a very small counterbalancing moment when the lip was in the pendant position and this resulted in a lack of control over the entire range of movement of the lip, so that the lip would crash down to the pendant position. Because of the noise involved in the falling of the lip, it was necessary to use shock absorbers to cushion the lip fall.

SUMMARY OF THE INVENTION

The invention is directed to an adjustable dockboard having an improved lip counterbalancing mechanism and in particular to a lip counterbalancing mechanism to be utilized with a dockboard of the type shown in U.S. Pat. No. 3,997,932, in which the lip is elevated as a consequence of the ramp moving downwardly from its upwardly inclined position.

More particularly, the counterbalancing mechanism includes a lip engaging arm which is pivotally connected to the lip hinge pin and is engageable with the undersurface of the lip. One end of a first link is pivotally connected to the arm at a location spaced from the hinge pin axis, and the opposite end of the first link is pivotally connected to a second link, the opposite end of which is pivotally connected to the ramp.

Mounted beneath the ramp is an extension spring and the spring is connected through a roller chain to the pivot axis between the two links.

When the lip is in the pendant position, the links are disposed at an acute angle with respect to each other and the longitudinal axis of the first link is in generaly alignment with the hinge axis, so that the force of the spring is acting through a relatively small moment.

As the lip is moved to the extended position, the links will be moved toward an in-line position which is offset from the pivot axis of the lip lifting arms and the spring contracts. Thus, even though the spring force is reduced as the lip moves toward its extended position, the moment arm, through which the spring force is exerted, is increased, to thereby provide a progressive increase in the counterbalancing moment as the lip is extended.

At its extended position, the weight of the lip is not fully counterbalanced so that the lip will fall by gravity to its pendant position when the truck pulls away from the loading dock. As there is a reduced, yet considerable counterbalancing force at the pendant position, the fall of the lip to its pendant position will be cushioned to thereby prevent the lip from slamming down to its pendant position and providing smoother and quieter operation.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of a dockboard incorporating a lip counterbalancing mechanism of the invention with the ramp shown in the inclined elevated position.

FIG. 2 is an enlarged side elevation showing the lip counterbalancing mechanism when the lip is in the pendant position;

FIG. 3 is an enlarged view similar to FIG. 2 showing the lip in the extended position;

FIG. 4 is a view taken along line 4—4 of FIG. 2; and

FIG. 5 is a top view of the lip counterbalancing linkage.

DESCRIPTION OF THE ILLUSTRATED EMBODIMENT

The drawings illustrate a dockboard 1 which is adapted to be mounted in a pit or depression in a loading dock 2. The dockboard 2 includes a frame 3 or supporting structure and a ramp 4 is hinged at its rear edge to the frame. The ramp is adapted to be biased upwardly to an inclined position by a spring assembly 5, such as that disclosed in U.S. Pat. No. 3,528,118. The spring assembly 5 includes a spring 6 that is connected through a lever arm 7 to the rear edge of the ramp and the force of the spring acts to move the lever arm 7 forwardly to thereby urge the ramp 4 to an upwardly inclined position, as shown in FIG. 1.

The ramp 4 can be held in any desired position by means of a holddown mechanism 8, as disclosed in U.S. Pat. No. 3,646,627. The holddown mechanism is a unidirectional device which prevents the upward movement of the ramo unless released, while permitting free downward movement of the ramp.

An extension lip 9 is pivoted to the forward edge of the ramp. The lip 9 and ramp 3 carry aligned hinge tubes 10 which receive a hinge pin 11. With this construction, the lip can be pivoted from a downwardly hanging pendant position, as shown in FIG. 2 to an extended position, in which the lip forms an extension to the upper surface of the ramp, as shown in FIG. 3. Engagement of the rear edge of the lip 9 with the forward surface of the ramp 4 prevents the lip from moving beyond the extended position in which it is generally flush with the ramp.

The lip 9 is moved from the pendant position to the extended position by a lip lifting mechanism 12, such as that shown in U.S. Pat. No. 3,997,932, and the lip lifting mechanism of that patent is incorporated herein by reference.

In general, the lip lifting mechanism 12 includes a link 13, one end of which is pivotally connected to a lug 14 mounted for pivoting movement about the axis of the hinge pin 11, and the lug 14 is engageable with the undersurface of the lip. The opposite end of link 13 is pivotally connected to a link 15 which is connected to a lug 16 that is mounted on the undersurface of the ramp. Links 13 and 15 constitute a toggle unit which is in the under-center position when the ramp is in the horizontal cross-traffic position. As the ramp is elevated, a latching bar 17 connected to the supporting structure engages the toggle unit, and when the ramp is subsequently walked down by the operator from the upwardly inclined position toward the cross traffic position, the relative movement of the ramp with respect to the latching bar 17 causes the toggle unit to move toward an in-line position to thereby move the lip 9 toward its partially elevated position. When the ramp has been walked down to a predetermined inclination, the toggle unit moves into an over-center relationship and the latching bar 17 is disengaged from the toggle unit. The over-center relationship of the toggle unit is maintained by the weight of the lip acting rearwardly through the lug 14 against the toggle unit.

When the ramp 4 is walked down to a position where the lip engages the bed of the truck, the engagement of the lip with the truck bed will move the lip to the fully extended position, thereby releasing the weight of the lip 9 from the toggle unit and enabling the toggle unit to move by gravity to its original under-center position. With the toggle unit broken, the lip will automatically fall to its pendant position when the truck pulls away from the dock.

In accordance with the invention, a lip counterbalancing mechanism 18 is associated with the lip to aid in counterbalancing the weight of the lip. The lip counterbalancing mechanism 18 includes an extension spring 19 which is located generally horizontally beneath the ramp. One end of spring 19 is connected to a lug 20 that depends from the undersurface of the ramp, while the opposite end of the spring 19 is connected through an adjustable turn buckle 21 to one end of a roller chain 22. Chain 22 passes over a sprocket 23, which is journalled within a bracket 24 mounted on the underside of the ramp, and the opposite end of the chain is connected through a clevis 25 to a bolt or pivot pin 26.

As best shown in FIG. 4, the ends of a pair of parallel links 27 are pivotally connected to the pin 26, and the opposite ends of the links 27 are pivotally connected to a pin 28 which extends between lugs 29 that exend downwardly from the ramp 4.

The corresponding ends of a pair of links 30 are also pivoted to the pin 26, while the opposite ends of the links 30 are pivotally connected to the end of a lip engaging arm 31 through pin 32. The arm 32 is secured to hinge tube 10 which is mounted for rotation about the hinge pin 11.

As shown in FIG. 3, the arm 32 is provided with a surface 33 which is adapted to engage the undersurface of the lip. In addition, the arm 32 is provided with a projection or stop 34 which is adapted to engage the rear edge of the lip 9 to limit pivotal movement of the arm in a rear or clockwise direction, as shown in FIG. 2.

FIG. 2 illustrates the position of the counterbalancing mechanism when the lip is in the pendant position. The links 27 and 30 are disposed in an undercenter condition in which they are located at an acute angle with respect to each other. The longitudinal axis of the links 30 is in general alignment with the hinge pin 11, so that the force of the spring 19, which is extended at this time, is acting through a very small moment arm (shown by A in FIG. 2) when the lip is in the pendant position.

As the lip is moved to its extended position, the force of the spring 19 will move the links 27 and 30 toward an in-line position, as shown in FIG. 3, so that the force of the spring will be acting through a moment arm B to provide a substantially increased counterbalancing moment. Thus, even though the spring force itself is decreased as the lip moves from the pendant position, the counterbalancing force will be increased due to the increase in the moment arm.

As the truck moves away from the dock, the lip will fall by gravity to its pendant position causing the links 27 and 30 to return to their original position as shown in FIG. 2. On descent of the lip, the spring is extended to provide a cushioning force against the free fall of the lip so that the lip will move smoothly and quietly to its pendant position.

Thus, the invention provides a counterbalancing effect at the lip pendant position but yet provides an increased counterbalancing effect as the lip is moved toward the extended position. The counterbalancing moment at the fully extended position will not fully counterbalance the weight of the lip, so that the lip is free to fall by gravity to its pendant position when the truck has pulled away from the dock.

Various modes of carrying out the invention are contemplated as being within the scope of the following claims particularly pointing out and distinctly claiming the subject matter which is regarded as the scope of the invention.

I claim:

1. A dockboard having an improved lip counterbalancing mechanism, comprising a supporting structure, a ramp hinged at its rear edge to the supporting structure and movable between a generally horizontal cross traffic position and an upwardly inclined position, a lip hinged to the forward edge of the ramp and movable between a downwardly hanging pendant position and an extended position, means for moving the ramp from the horizontal position to the upwardly inclined position, and a lip counterbalancing mechanism comprising a lip engaging arm pivotally connected about a pivot axis to the ramp and engageable with the underside of the lip, a first link pivotally connected to said arm at a location spaced from said pivot axis, a second link pivotally interconnecting the first link and the ramp, said first and second links being disposed at an acute angle with respect to each other when the lip is in the pendant position, biasing means connected to one of said links with the force of said biasing means disposed to pivot said links toward an in-line position, said biasing means acting through a first moment arm when the lip is in the pendant position to provide a first counterbalancing force against the lip, said biasing means acting through a second moment arm substantially greater than said first moment arm when the lip is at the extended position to thereby provide a second counterbalancing force against the lip which is greater than said first counterbalancing force.

2. The dockboard of claim 1, wherein said biasing means comprises a spring connected to the ramp, and a flexible member connecting the spring to one of said links.

3. The dockboard of claim 2, wherein said flexible member is connected to the pivotal connection between said links.

4. The dockboard of claim 3, wherein said spring is an extension spring disposed generally horizontally beneath the ramp, and a guide member mounted on the underside of the ramp, said flexible member extending over said guide member and being connected to said pivotal connection.

5. A dockboard having an improved lip counterbalancing mechanism, comprising a supporting structure, a ramp hinged at its rear edge to the supporting structure and movable between a generally horizontal cross traffic position and an upwardly inclined position, a lip hinged to the forward edge of the ramp and movable between a downwardly hanging pendant position and an extended position, means for moving the ramp from the horizontal position to the upwardly inclined position, and a lip counterbalancing mechanism comprising a lip engaging arm mounted for pivotal movement about said hinge axis and having a surface engageable with the underside of the lip, a first link having one end pivotally connected to said lip engaging arm at a location spaced from said hinge axis, a second link having one end pivotally connected to the opposite end of said first link at a pivot axis, the opposite end of said second link being pivotally connected to said ramp at a fixed second pivot axis, a spring connected to the ramp, a flexible member having one end connected to the spring and the opposite end connected to one of said links adjacent said first pivot axis, whereby the force of said spring acts to move said links toward an in-line position and pivot said arm forwardly to provide a counterbalancing action to aid in moving the lip to its extended position, said links being disposed so that the force of the spring when the lip is in the pendant position will act through a relatively small moment arm to provide a first counterbalancing moment acting against said lip, and said links being disposed so that when the lip is moved toward the extended position the force of the spring will act through a substantially greater moment arm to provide a second counterbalancing moment substantially greater than said first counterbalancing moment.

6. The dockboard of claim 5, wherein said spring is disposed to exert a greater spring force when the lip is in the pendant position than when the lip is in the extended position.

7. The dockboard of claim 6, wherein said spring is an extension spring, and a guide member mounted on the undersurface of the ramp, said flexible member passing over said guide member and extending downwardly to the connection to one of said links.

8. The dockboard of claim 5, and including stop means on said arm to limit pivotal movement of the arm about said hinge axis.

9. The dockboard of claim 8, wherein said stop means comprises a projection on the arm disposed to engage the rear edge of the lip.

10. A dockboard having an improved lip counterbalancing mechanism, comprising a supporting structure, a ramp hinged at its rear edge to the supporting structure and movable between a generally horizontal cross traffic position and an upwardly inclined position, a lip hinged to the forward edge of the ramp and movable between a downwardly hanging pendant position and an extended position, means for moving the ramp from the horizontal position to the upwardly inclined position, and a lip counterbalancing mechanism comprising a lip engaging arm mounted for pivotal movement about said hinge axis and having a surface engageable with the underside of the lip, a first link having one end pitovally connected to said lip engaging arm at a location spaced from said hinge axis, a second link having one end pivotally connected to the opposite end of said first link at a pivot axis, the opposite end of said second link being pivotally connected to said ramp at a fixed second pivot axis, an extension spring mounted generally horizontally beneath the ramp and having a rear end connected to the ramp, a flexible member having one end connected to the forward end of the spring, a guide member mounted beneath the ramp and located forwardly of said spring to guide the flexible member in movement, the opposite end of said flexible member extending downwardly from said guide member and being connected to said first pivot axis, whereby the force of said spring acts to move said links toward an in-line position and pivot said arm forwardly to provide a counterbalancing action to aid in moving the lip to its extended position, said spring being disposed to exert a greater spring force when the lip is in the pendant position than when the lip is in the extended position, said links being disposed so that the force of the spring when the lip is in the pendant position will act through a relatively small moment arm to provide a first counterbalancing moment acting against said lip, and said links being disposed so that when the lip is moved toward the extended position the force of the spring will act through a substantially greater moment arm to provide a second counterbalancing moment substantially greater than said first counterbalancing moment.

* * * * *